(12) United States Patent
Radenbaugh et al.

(10) Patent No.: US 9,862,434 B2
(45) Date of Patent: Jan. 9, 2018

(54) STANDING ELECTRIC VEHICLE FOR GOLF COURSE TRAVEL

(71) Applicant: SOL BOARDS, INC., Bend, OR (US)

(72) Inventors: Michael Jay Radenbaugh, Seattle, WA (US); Robert Anthony Wilk, Mi Wuk Village, CA (US); Starling T. Faraon, Princeville, HI (US); Dean F. Fuschetti, Rumson, NJ (US); Joseph Israel Wolf, Garberville, CA (US)

( * ) Notice: Subject to any disclaimer, the term of this patent is extended or adjusted under 35 U.S.C. 154(b) by 0 days.

(21) Appl. No.: 15/003,435

(22) Filed: Jan. 21, 2016

(65) Prior Publication Data

US 2017/0210433 A1 Jul. 27, 2017

(51) Int. Cl.
| | | |
|---|---|---|
| B62D 51/02 | (2006.01) | |
| B62D 51/00 | (2006.01) | |
| B60K 1/00 | (2006.01) | |
| F16D 63/00 | (2006.01) | |
| F16D 121/20 | (2012.01) | |

(52) U.S. Cl.
CPC .............. B62D 51/02 (2013.01); B60K 1/00 (2013.01); B62D 51/001 (2013.01); B62D 51/005 (2013.01); F16D 63/002 (2013.01); *F16D 2121/20* (2013.01)

(58) Field of Classification Search
CPC ...... B60K 1/00; B62D 51/001; B62D 51/005; F16C 63/002; F16C 2121/20
USPC ........................................................ 180/65.1
See application file for complete search history.

(56) References Cited

U.S. PATENT DOCUMENTS

| | | | | | |
|---|---|---|---|---|---|
| 1,072,284 | A | * | 9/1913 | Widera | B62M 1/32 280/254 |
| 3,211,248 | A | * | 10/1965 | Quayle | B60K 1/00 180/13 |
| 3,224,524 | A | * | 12/1965 | Laher | B60K 1/00 180/214 |
| 3,648,795 | A | * | 3/1972 | Moulton | B62B 3/12 180/216 |
| 4,193,612 | A | * | 3/1980 | Masser | B60G 11/23 267/293 |
| 4,538,695 | A | * | 9/1985 | Bradt | B60L 11/1805 180/19.2 |
| 4,570,732 | A | * | 2/1986 | Craven | B62B 5/0026 180/19.3 |
| 4,874,055 | A | * | 10/1989 | Beer | B62B 5/0026 180/19.2 |
| 5,137,103 | A | * | 8/1992 | Cartmell | B62B 3/001 180/13 |

(Continued)

FOREIGN PATENT DOCUMENTS

WO 2013166543 11/2013

OTHER PUBLICATIONS

Golfboard—Surf the Earth—Owner's Manual—Aug. 2014.
(Continued)

*Primary Examiner* — James A Shriver, II
*Assistant Examiner* — Brian L Cassidy
(74) *Attorney, Agent, or Firm* — Mark S. Hubert

(57) ABSTRACT

The present disclosure features standing electric vehicles for golf course travel that include a skateboard-like deck. The vehicles disclosed herein, referred to as "golf boards," include features that enhance the safety and ease of use of the vehicle, including power-off electromagnetic braking systems.

5 Claims, 13 Drawing Sheets

(56) References Cited

U.S. PATENT DOCUMENTS

| | | | | | |
|---|---|---|---|---|---|
| 5,263,547 | A * | 11/1993 | Alber | ................... | A61G 5/061 180/357 |
| 5,769,183 | A * | 6/1998 | Richter | ................... | B66B 5/027 187/249 |
| 5,775,467 | A * | 7/1998 | Knuth | ................... | B60T 8/4266 188/161 |
| 5,997,018 | A * | 12/1999 | Lee | ................... | A63C 17/0046 280/11.28 |
| 6,227,324 | B1 * | 5/2001 | Sauve | ................... | B62D 61/02 180/181 |
| 6,231,067 | B1 * | 5/2001 | Johnson | ................... | A61G 5/14 180/65.1 |
| 6,263,990 | B1 * | 7/2001 | Liu | ................... | B62D 51/02 180/65.1 |
| 6,267,190 | B1 * | 7/2001 | Micheletti | ................... | B62K 3/002 180/183 |
| 6,371,228 | B1 * | 4/2002 | Husted | ................... | A61G 5/045 180/65.1 |
| 6,695,269 | B1 * | 2/2004 | Anscher | ................... | A45C 13/30 224/269 |
| 6,851,498 | B1 * | 2/2005 | Sauve | ................... | B60N 2/24 180/208 |
| 6,907,949 | B1 * | 6/2005 | Wang | ................... | B60L 11/1877 180/19.1 |
| 7,029,015 | B2 * | 4/2006 | Lin | ................... | A45C 9/00 190/18 A |
| 7,040,443 | B1 * | 5/2006 | Roth | ................... | B62K 3/002 180/220 |
| 7,086,491 | B2 * | 8/2006 | Matte | ................... | A61G 5/042 180/21 |
| 7,192,040 | B2 * | 3/2007 | Xie | ................... | B62D 51/001 180/216 |
| 7,243,572 | B1 * | 7/2007 | Arling | ................... | A63C 17/08 464/162 |
| 7,290,628 | B2 * | 11/2007 | Kirkpatrick | ................... | B62K 3/002 180/180 |
| 7,303,032 | B2 * | 12/2007 | Kahlert | ................... | B62K 11/007 180/21 |
| 7,322,434 | B1 * | 1/2008 | Hussain | ................... | B62H 1/12 180/180 |
| 7,363,993 | B2 * | 4/2008 | Ishii | ................... | A63C 17/08 180/218 |
| 7,510,204 | B2 * | 3/2009 | Inoue | ................... | B60D 1/00 280/491.3 |
| 7,537,076 | B2 * | 5/2009 | Falkiner | ................... | A63B 55/61 180/208 |
| 7,584,974 | B2 * | 9/2009 | Jackman | ................... | B62K 15/006 180/181 |
| 7,631,715 | B2 * | 12/2009 | Falkiner | ................... | B62K 5/027 180/210 |
| 7,661,858 | B2 * | 2/2010 | Chuang | ................... | B62J 6/02 362/191 |
| 7,699,130 | B2 * | 4/2010 | Palmer | ................... | B62K 3/002 180/180 |
| 7,717,200 | B2 * | 5/2010 | Kakinuma | ................... | A63C 17/08 180/218 |
| 7,740,099 | B2 * | 6/2010 | Field | ................... | A63C 17/01 180/282 |
| 7,810,591 | B2 * | 10/2010 | Yamano | ................... | B60L 11/1805 180/65.1 |
| 7,837,204 | B1 * | 11/2010 | Groenenboom | ... | A63C 17/0093 280/11.27 |
| 7,962,256 | B2 * | 6/2011 | Stevens | ................... | G05D 1/0891 180/167 |
| 8,068,976 | B2 * | 11/2011 | Kosaka | ................... | B62K 11/007 180/218 |
| 8,226,281 | B2 * | 7/2012 | Wei | ................... | B62J 6/02 362/249.03 |
| 8,251,384 | B1 * | 8/2012 | Christensen | ........ | A63C 17/012 280/11.115 |
| 8,256,545 | B2 * | 9/2012 | Oikawa | ................... | B60L 15/2009 180/181 |
| 8,532,877 | B2 * | 9/2013 | Oikawa | ................... | B60L 15/2036 180/218 |
| 8,631,892 | B2 * | 1/2014 | Constin | ................... | B62B 1/002 180/208 |
| 9,272,739 | B2 * | 3/2016 | Zaid | ................... | B62K 3/002 |
| 9,289,339 | B2 * | 3/2016 | Gray | ................... | B62K 3/002 |
| 9,403,573 | B1 * | 8/2016 | Mazzei | ................... | B62D 51/02 |
| 9,469,322 | B2 * | 10/2016 | Du Toit | ................... | B62B 5/0033 |
| 2002/0000339 | A1 * | 1/2002 | Tsai | ................... | B62K 3/002 180/65.1 |
| 2002/0063006 | A1 * | 5/2002 | Kamen | ................... | A63C 17/01 180/171 |
| 2002/0066610 | A1 * | 6/2002 | Tsai | ................... | B62K 3/002 180/220 |
| 2002/0170763 | A1 * | 11/2002 | Townsend | ............... | B60L 15/20 180/220 |
| 2003/0094315 | A1 * | 5/2003 | White | ................... | B60L 8/00 180/2.2 |
| 2003/0146025 | A1 * | 8/2003 | Kamen | ................... | A63C 17/12 180/65.1 |
| 2004/0118622 | A1 * | 6/2004 | Morrell | ............... | B60L 11/1851 180/65.1 |
| 2004/0188153 | A1 * | 9/2004 | Liu | ................... | B62K 3/002 180/65.1 |
| 2004/0216929 | A1 * | 11/2004 | White | ................... | B60L 8/003 180/2.2 |
| 2004/0262871 | A1 * | 12/2004 | Schreuder | ............... | B60P 3/007 280/87.1 |
| 2005/0167168 | A1 * | 8/2005 | Puzey | ................... | B60G 13/005 180/65.1 |
| 2006/0131084 | A1 * | 6/2006 | Rupp | ................... | A63C 17/0013 180/65.1 |
| 2006/0191726 | A1 * | 8/2006 | Matte | ................... | A61G 5/042 180/65.1 |
| 2006/0220334 | A1 * | 10/2006 | Liao | ................... | B62B 1/002 280/47.34 |
| 2007/0034430 | A1 * | 2/2007 | Hsiao | ................... | B62K 5/025 180/68.5 |
| 2008/0196951 | A1 * | 8/2008 | Gal | ................... | A63B 55/087 180/65.1 |
| 2009/0255747 | A1 * | 10/2009 | Kasaba | ................... | B62D 51/02 180/208 |
| 2010/0132167 | A1 * | 6/2010 | Ueda | ................... | B62J 6/00 24/16 R |
| 2010/0176574 | A1 * | 7/2010 | Pollice | ................... | B62B 3/02 280/401 |
| 2012/0118657 | A1 * | 5/2012 | Liao | ................... | A63B 55/61 180/208 |
| 2013/0192908 | A1 * | 8/2013 | Schlagheck | ............... | B60K 1/04 180/65.1 |
| 2013/0292196 | A1 * | 11/2013 | Ooka | ................... | B62J 1/28 180/65.1 |
| 2015/0034402 | A1 * | 2/2015 | Dourado | ................... | A45F 3/04 180/181 |
| 2015/0075883 | A1 * | 3/2015 | Ward | ................... | A63C 17/12 180/65.6 |
| 2015/0083506 | A1 * | 3/2015 | Koike | ................... | B60K 1/02 180/65.6 |
| 2015/0122566 | A1 * | 5/2015 | Constien | ................... | B62H 1/02 180/210 |
| 2016/0083024 | A1 * | 3/2016 | Mori | ................... | B62D 51/001 701/70 |
| 2016/0129953 | A1 * | 5/2016 | Johnson | ................... | B62K 3/002 180/65.8 |
| 2016/0158635 | A1 * | 6/2016 | Aders | ................... | A63C 17/12 180/65.1 |
| 2016/0206949 | A1 * | 7/2016 | Murphy | ................... | A63C 17/013 |

OTHER PUBLICATIONS

GolfBoarding 101: Your Guide to the GolfBoard!—https://www.youtube.com/watch?v=WZjUflhVa7Q—Published Jul. 10, 2014.

\* cited by examiner

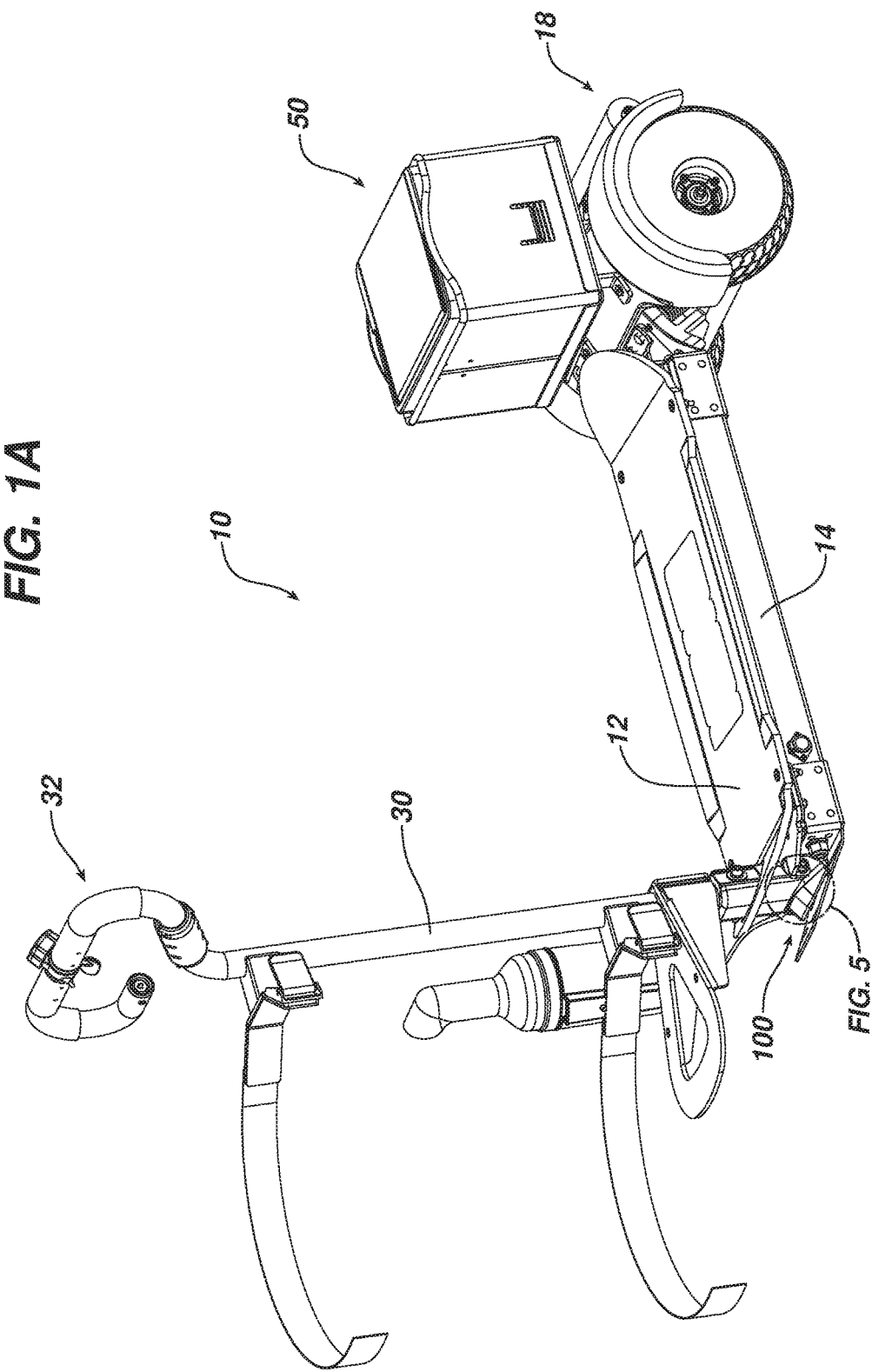

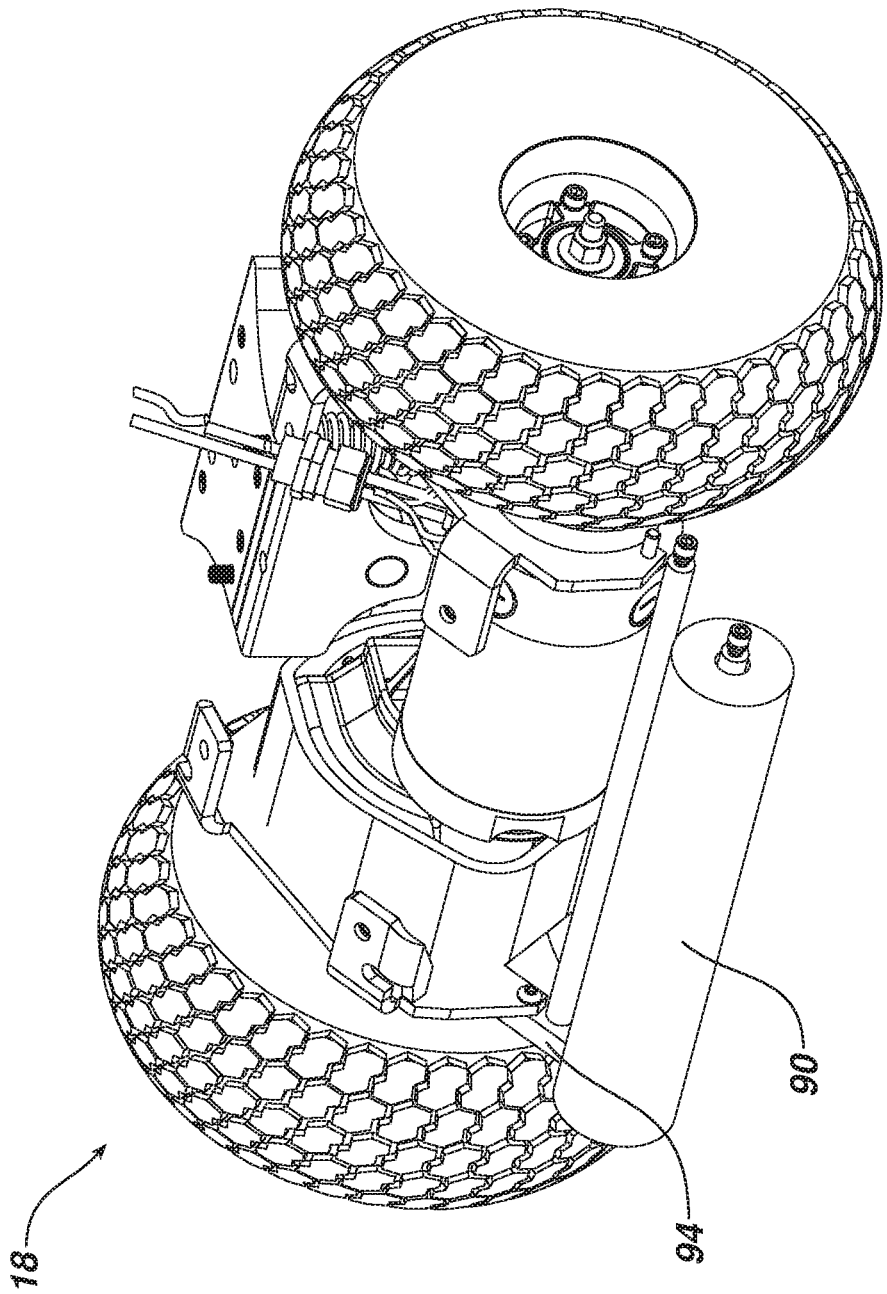

STANDING ELECTRIC VEHICLE FOR GOLF COURSE TRAVEL

BACKGROUND

Efforts have been made to develop standing electric vehicles for use in golf environments. Ideally, such a vehicle would provide a fun and safe means of transport, allowing a golfer to easily travel around a golf course with his or her gear.

Examples of standing electric vehicles that include a skateboard-like deck include that described in WO 2013/166543, and those previously commercially available from GolfBoard Inc. Other standing golf carts have been proposed, e.g., as disclosed in U.S. Pat. No. 4,874,055.

SUMMARY

The present disclosure features standing electric vehicles for golf course travel that include a skateboard-like deck. The vehicles disclosed herein, which will be referred to as "golf boards" hereafter, include features that enhance the safety and ease of use of the vehicle.

In one aspect, the disclosure features a device that includes (a) a deck configured to support a user in a standing position, (b) a stability bar mounted on and extending vertically from the deck, (c) wheel assemblies mounted on front and rear portions of the deck, (d) a drive motor having a drive shaft operatively coupled to one of the wheel assemblies to rotate a drive axle of the wheel assembly; and (e) a power-off electromagnetic brake configured to apply a force to the drive shaft when power to the drive motor is lost or the brake is applied.

Some implementations include one or more of the following features.

The device may further include a control assembly for the brake, comprising a brake actuator switch mounted on a handlebar portion of the stability bar. The control assembly may also include wiring providing electrical communication between the brake actuator switch and the brake.

The device may further include a throttle mounted on the handlebar portion of the stability bar, in which case the brake actuator switch may be mounted sufficiently close to the throttle so that a user can operate the brake actuator switch and throttle with the same hand without letting go of the stability bar.

The device may include an electronic braking system configured to adjust the resistance of the motor to control acceleration and deceleration of the device.

The electromagnetic brake may be spring operated, and may be configured to apply a force of at least 5 Nm to the drive shaft, and/or to bring the device, carrying a 285 pound payload, to a stop within 18 feet when the device is traveling at 14 MPH.

In another aspect, the disclosure features a device that includes (a) a deck configured to support a user in a standing position, (b) wheel assemblies mounted on front and rear portions of the deck, each wheel assembly having a drive axle, (c) a power train, operatively associated with at least one of the wheel assemblies, comprising a drive motor and a gear box; and (d) a cross bar, extending generally parallel to the drive axle, mounted outboard of the power train, and positioned between the lowest point of the power train and the ground during use, such that the cross bar protects the power train from impact during use of the device.

Some implementations include one or more of the following features.

The cross bar may include an inner steel bar and an outer plastic wrap. The outer plastic wrap may be formed of an impact-resistant plastic having a dynamic coefficient of friction of 0.25 or less. The inner steel bar may have a diameter of about 10-20 mm and the plastic wrap may have a thickness of at least 8 mm. The device may further include a stability bar mounted on and extending vertically from the deck, and/or any of the other features discussed above.

In yet another aspect, the disclosure features a device that includes (a) a deck configured to support a user in a standing position, (b) wheel assemblies mounted on front and rear portions of the deck, (c) a power train, operatively associated with at least one of the wheel assemblies, comprising a drive motor and a gear box; and (d) a suspension system configured to resiliently join the wheel assemblies to the deck, the suspension system comprising a pair of spring ends positioned at opposite ends of the deck, the spring ends being configured to flex during use of the device.

Some implementations include one or more of the following features.

The device may further include a pair of elastomeric bump stops configured to limit flexing of the spring ends, decreasing the spring rate of the suspension system. At least one of the bump stops may include a relief feature configured to allow a degree of flexing to occur before the bump stop decreases the spring rate.

The spring ends may be disposed at a spring angle relative to the plane of the lower surface of the deck of from about 25 to 45 degrees.

The spring ends may be formed of 410 Stainless Steel that has been heat treated to spring temper the steel to a Rockwell Hardness of C 41-45.

In a further aspect, the disclosure features a device that includes (a) a deck configured to support a user in a standing position, (b) wheel assemblies mounted on front and rear portions of the deck, (c) a power train, operatively associated with at least one of the wheel assemblies, comprising a drive motor and a gear box; and (d) an accessory mounting system configured to allow an accessory to be removably mounted on the device, the accessory mounting system comprising a mounting plate positioned behind the deck and over the rear wheel assembly, the mounting plate being configured to receive an accessory plate on a lower surface of the accessory in releasable locking engagement.

Some implementations include one or more of the following features.

The mounting plate may include generally L-shaped retaining elements that receive the accessory plate in sliding engagement. The mounting plate may further include a spring loaded tongue member that is resiliently deflected as the accessory plate slides into place and returns to its normal position to lock the accessory plate in place.

The accessory plate may include comprise a rim, spaced from the lower surface of the accessory, configured to slide under the L-shaped retaining elements on the mounting plate.

In another aspect, the disclosure features a device that includes (a) a deck configured to support a user in a standing position, (b) wheel assemblies mounted on front and rear portions of the deck, and (c) a power train, operatively associated with at least one of the wheel assemblies, comprising a drive motor, wherein the deck includes an outer surface portion having a tread pattern, and an inner surface portion that is smooth.

DESCRIPTION OF THE DRAWINGS

FIG. 1A is a perspective view of the golf board with the front wheel assembly removed, FIG. 1A also shows an accessory mounted on the rear rack shown in FIG. 1.

FIG. 4 is a perspective view of a portion of the undercarriage of the golf board, showing a skid bar.

DETAILED DESCRIPTION

The golf boards disclosed herein include a number of features intended to enhance safety, durability, ease of use, and user convenience. These features will be discussed in detail below.

Figure 1:
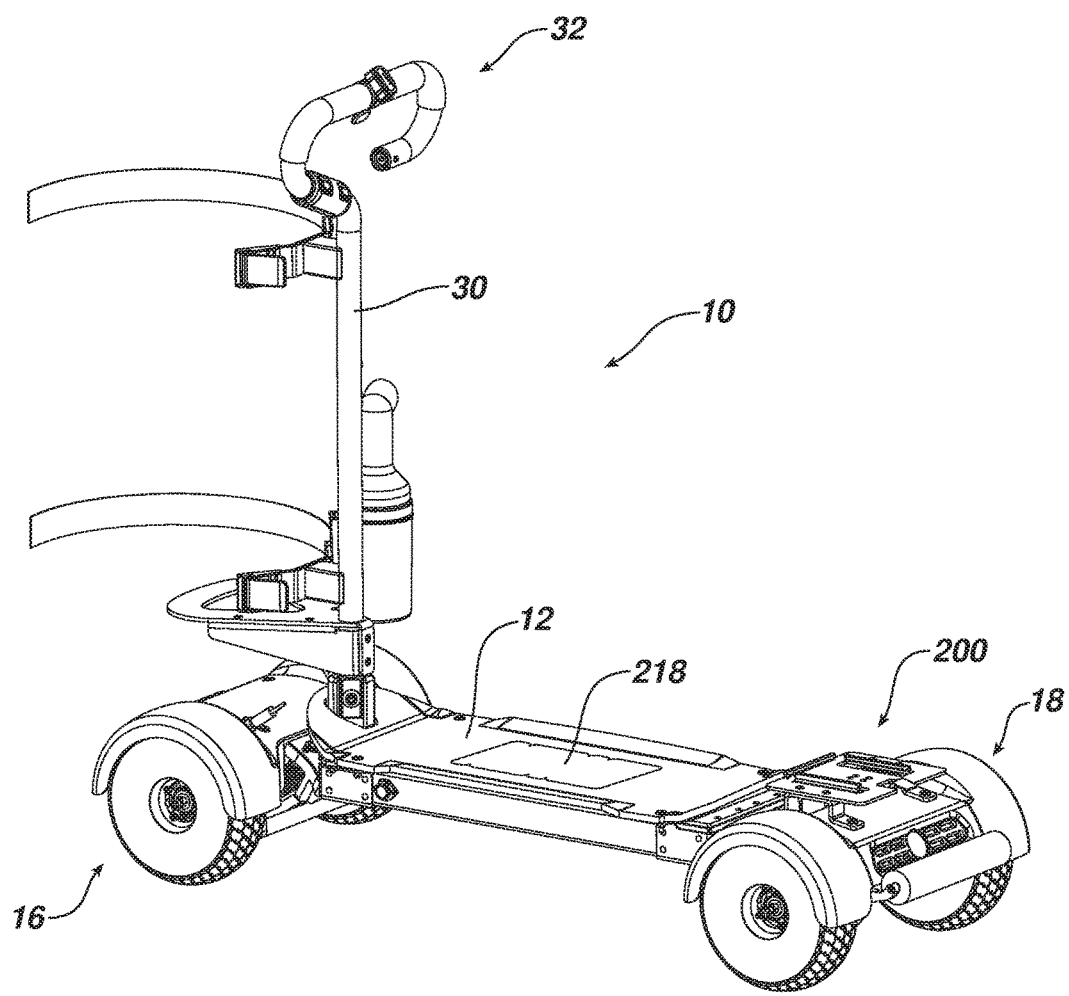
FIG. 1 is a perspective view of a golf board according to one embodiment.
Figure 1B:
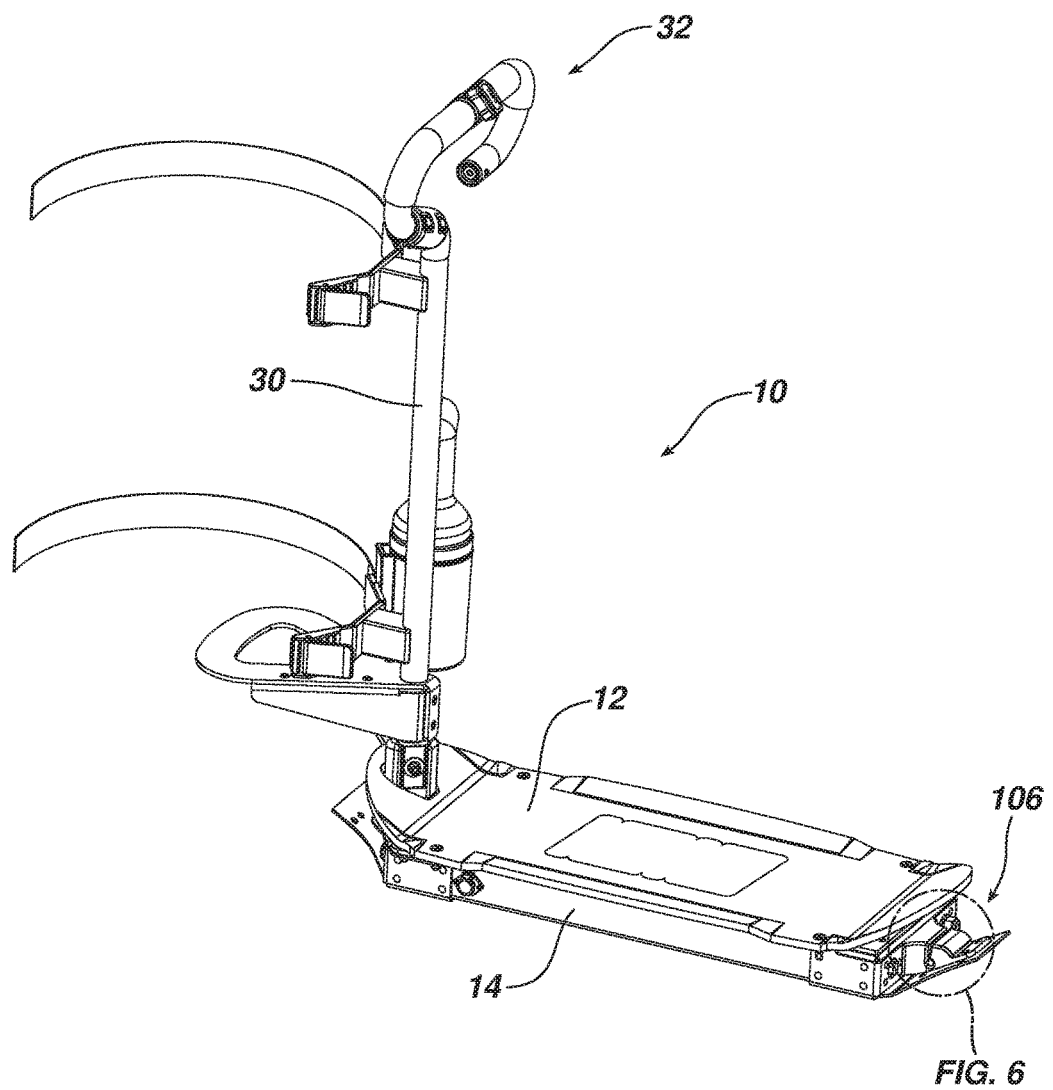
FIG. 1B is a perspective view of the golf board with the rear wheel assembly removed.

An example of a golf board according to one implementation is shown in FIG. 1. Golf board 10 includes a deck 12, configured to support a standing rider, mounted on a frame assembly 14. A battery pack and an electronics tray (not shown) are mounted to the underside of the frame assembly, beneath the deck. Front and rear wheel assemblies 16, 18, are operatively joined to the frame assembly 14, with various suspension features that will be discussed below. At least one of the wheel assemblies is driven by a power train, shown in FIG. 3, that includes a motor 20, gearbox 22 and drive axle 24. In some implementations both wheel assemblies are driven, each by its own power train. The battery pack supplies power to the motor(s). An electromagnetic brake 26 mounted on the rear drive axle provides mechanical braking. Electromagnetic brake 26 is part of an electromagnetic braking system that will be discussed further below.

Figure 2:
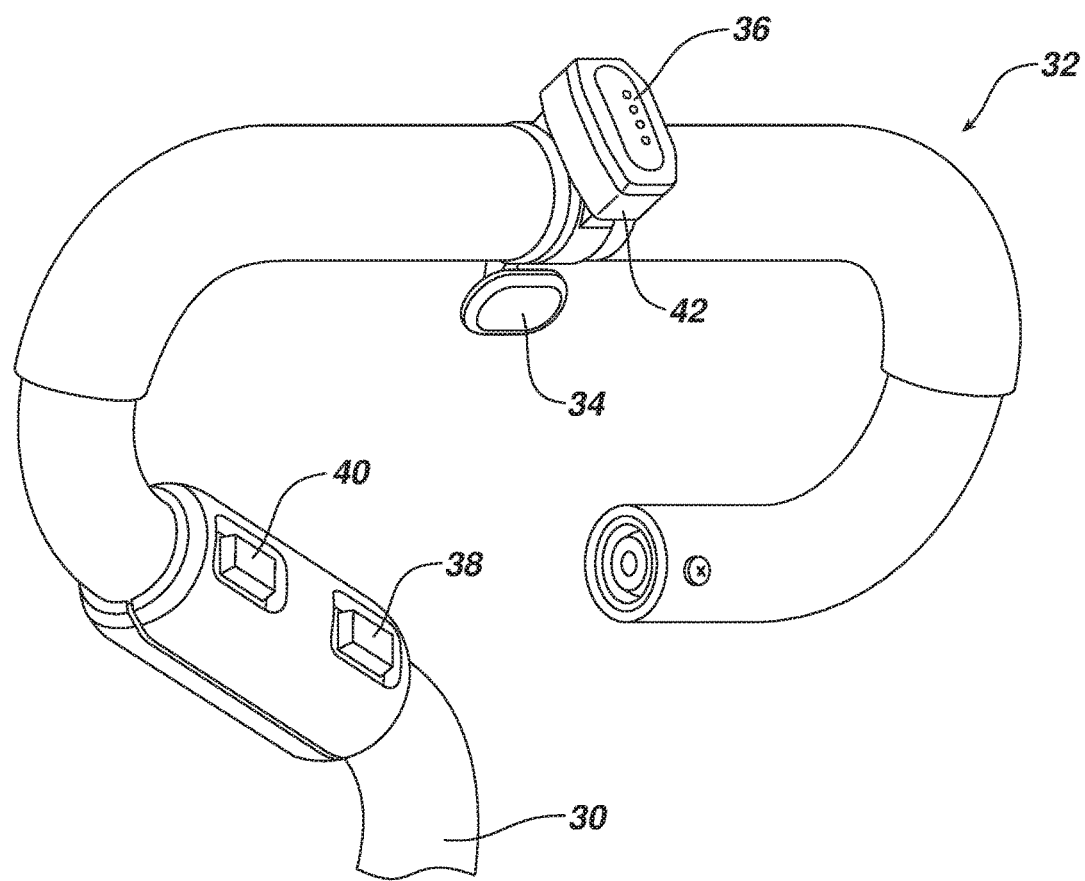
FIG. 2 is a perspective view showing an upper portion of the stability bar of the golf board shown in FIG. 1.

Referring again to FIG. 1, golf board 10 also includes a stability bar 30 that terminates at its upper end in a handlebar 32. The stability bar allows the user to hold on while driving, assisting with balance and enhancing the confidence and comfort of the user. As shown in FIG. 2, various control components are mounted on the handlebar 32, allowing the user to safely control the board without letting go of the handlebar. Referring to FIG. 2, these components include a thumb-operated throttle 34, an LED battery level indicator 36, a high/low switch 38, and a forward/reverse/park switch 40. The "park" setting of the switch 40 also serves as an emergency brake switch, as will be discussed below. The controls also include an on/off switch 42. These controls are connected, via a wiring harness 46 (FIG. 3), to a controller that operates the powertrain and electromagnetic brake.

Prior golf boards have included handlebar-mounted controls, but have not included a parking/emergency brake actuator, since prior boards did not include a parking or emergency brake that could be manually actuated by the user.

Referring again to FIG. 1, the golf board 10 also includes a cooler and accessory mounting system 50, which will be discussed in further detail below.

Electromagnetic Braking System

Figure 3:
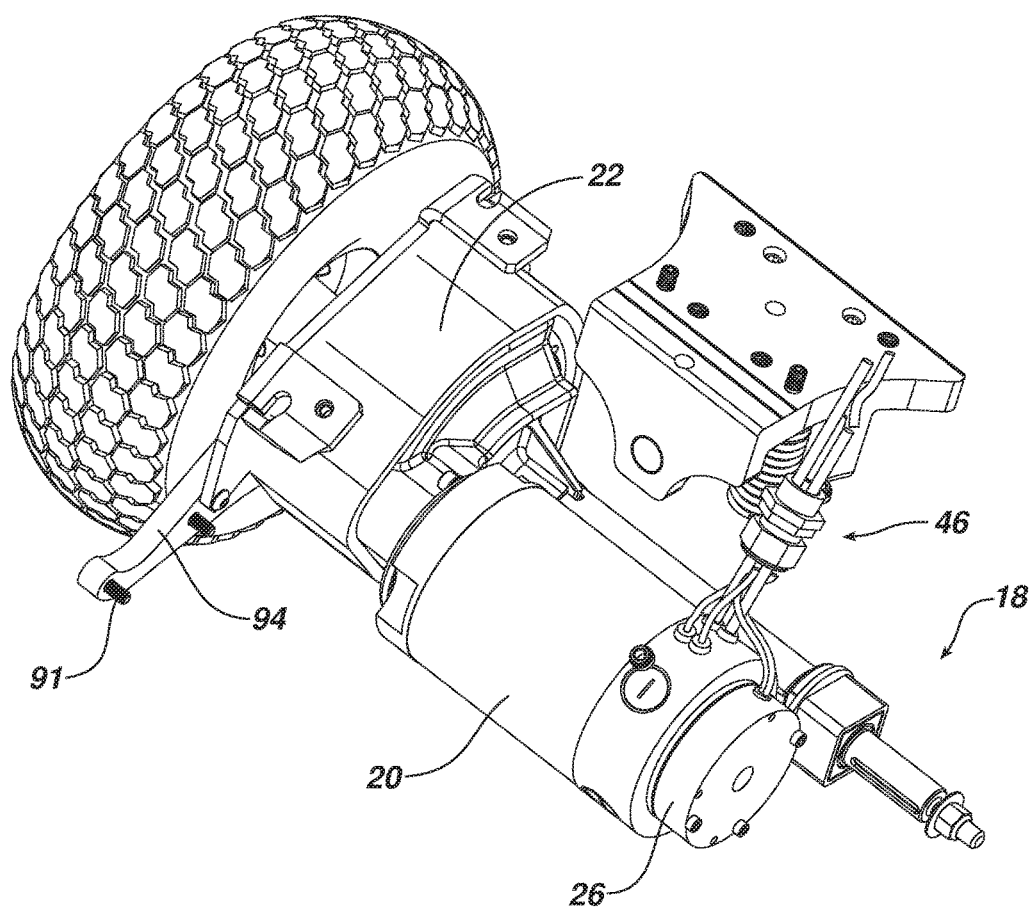
FIG. 3 is a perspective view of components of the drive train of the golf board.

Referring first to FIGS. 1-3, the golf boards described herein employ an electromagnetic braking system that is configured both to be actuated automatically if power is lost, and to be readily manually actuated by a user for use as a parking brake or to make an emergency stop.

The golf boards disclosed herein, like prior golf boards commercially available from GolfBoard Inc., have a programmed automatic anti-rollback restraint. This feature is useful when dismounting the board on hilly terrain, which is commonly found on golf courses. Users can park the board on a slope and by simply releasing the accelerator the board will tend to resist rolling away. The motor controller intelligently shorts the motor leads together, which increases the motor resistance to spinning, automatically locking the board with an electronic brake. This system also can be programmed to provide controlled acceleration and deceleration by varying the resistance of the motor. However, this electronic braking system will not function in the event of a power loss, and thus if power is lost during use of this type of board the result can be a runaway condition. Moreover, electronic braking is not always sufficient to prevent rolling of the board on steeper inclines. As a result, users of prior boards were advised to park the board on flat terrain to prevent the board from rolling.

Advantageously, the electromagnetic braking system of golf board 10 features an electromagnetic brake that is closed when de-energized (a "power-off" electromagnetic brake), as will be discussed below. The brake is actuated automatically as soon as power is lost, preventing a runaway board situation.

In preferred implementations, the electromagnetic brake is configured to provide braking force in a manner that will be effective to stop the golf board when the motor loses power while the board is in motion, without stopping so suddenly that the user is likely to fall.

The electromagnetic brake also activates automatically whenever the user puts the board in "park" using the forward/reverse/park switch 40. Providing a mechanical brake that actuates when the board is in park improves user safety when stepping on/off the board, since the user can cause the board to remain stationary, and prevents the board from running away if parked on an incline. The user can also actuate the brake while the board is in motion, to stop the board rapidly in the event of an emergency, e.g., to avoid a collision or the like.

The electromagnetic brake is controlled by a controller (not shown) that is in wired communication with the brake 26 and with the forward/reverse/park switch 40 via the wiring harness 46. This wired control set-up allows user to actuate the parking brake while holding the handlebar, which enhances safety when the parking brake is used as a user-applied emergency brake. Because the forward/reverse/park switch 40 is positioned close to the throttle the user can actuate the electromagnetic brake while the board is in motion without letting go of the handlebar. In preferred implementations the throttle and the switch 40 are positioned so that they can be operated with one hand without the user letting go of the handlebar.

Electromagnetic power-off brakes are well known in the art, and are commercially available. In some implementations the electromagnetic brake is a brake in the "electromagnetic safety brake power-off ALS series" manufactured by Chain Tail Co., Ltd. Other suitable brakes include the electromagnetic spring-applied power-off brakes manufactured by Warner Electric and Ogura Industrial Corp. Preferably, the brake, motor and controller form an integrated unit.

Preferred brakes are designed to bring a fully loaded golf board (deemed to be a 285 pound payload) to a stop within 18 feet when the golf board is traveling at 14 MPH. In preferred implementations, the brake applies at least 5 Nm, e.g., approximately 6 Nm, of force to the braking surfaces.

In some preferred embodiments, the spring tension of the electromagnetic brake is selected so that emergency stopping will not be so sudden as to throw the user from the board. The torque of the brake can be adjusted, e.g., from 2 to 8 Nm, by tightening or loosening spring nuts that control the tension of a coil spring of the brake. A spring torque of about 3 to 4 Nm generally provides a stop that is rapid but not too abrupt for most riders.

Figure 3A:
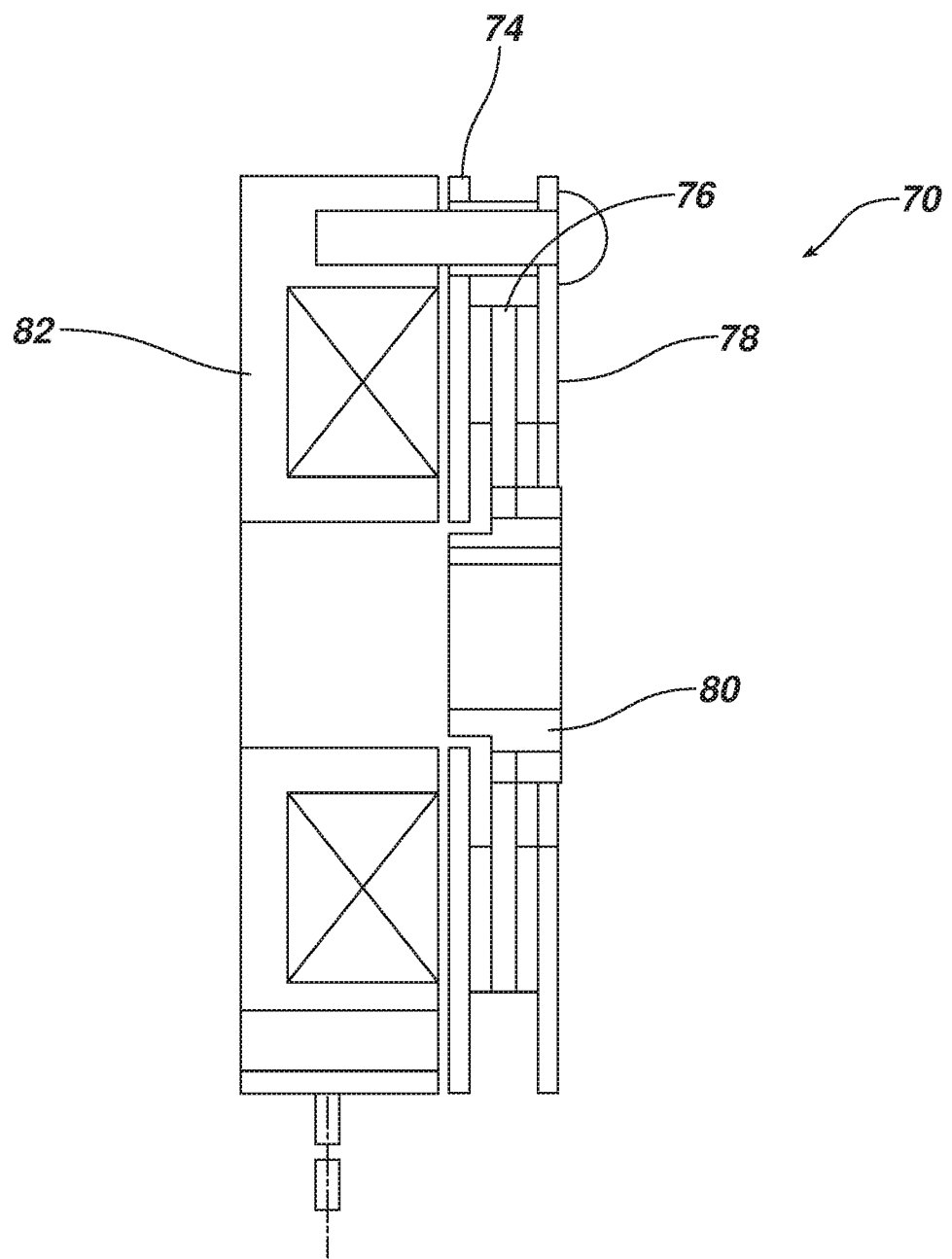
FIG. 3A is a diagrammatic view of components of an electromagnetic brake.

A diagrammatic view of a power-off electromagnetic brake 70 is shown in FIG. 3A. When no current/voltage is applied to the brake, one or more coil springs (not shown) push against a pressure plate 74, squeezing a friction disk 76 between the pressure plate 74 and an outer cover plate 78. This frictional clamping force is transferred to the hub 80, which is mounted to the motor shaft 24. The hub applies pressure to the motor shaft, preventing rotation of the shaft and thus the wheel assembly that is operatively connected to the motor shaft.

When the brake is required to release, voltage/current is applied to a magnetic coil 82, disposed adjacent to the pressure plate 74, creating a magnetic field. This magnetic field draws the pressure plate towards the coil, pulling against the springs. This in turn creates an air gap between the pressure plate and the friction disk, allowing the friction disk to turn freely with the shaft.

Skid Bar and Gear Box Wrap System

The golf board 10 also includes features that enhance the durability of the board. Due to the uneven terrain and obstacles encountered on a golf course, the undercarriage of the board is subjected to impacts, e.g., with curbs, rocks and other obstacles, that can damage components of the power train and/or the wheel assembly.

Referring to FIG. 4, a cross bar 90 is mounted outboard of the wheel assembly (forward of the front wheels and rearward of the rear wheels), and positioned on end mounts 94 such that the lower surface of the cross bar extends below the lowest point of the power train. The cross bar 90 acts as a skid bar, preventing damage to the power train and protecting the wheel assembly. Because the cross bars are positioned outboard of the power train and wheel assembly a cross bar will be the first point of contact with any obstacles, regardless of whether the board is operated in forward or reverse mode.

The cross bar 90 includes a steel bar that wrapped with a slippery outer tube formed of an impact-resistant plastic. The outer plastic tube may be, for example, formed of ultra high molecular weight polyethylene (UHMW). Other suitable plastics include plastics that are impact resistant and have a low coefficient of friction, for example polyethylene, polycarbonate, nylon, and polyoxymethylene (e.g., DELRIN® acetal polymer). In some implementations, the outer plastic tube has a wall thickness of at least 8 mm, e.g., from about 6 to 20 mm. The inner steel bar preferably has a diameter of from about 10 to 20 mm. The combination of a rigid steel internal bar and an outer wrap having a low coefficient of friction (e.g., a dynamic coefficient of friction of 0.25 or less, measured by ASTM D 3702) makes the cross bar both robust and slippery, allowing the board to slide over obstacles such as the many curbs that are present on most golf courses.

Figure 4A:
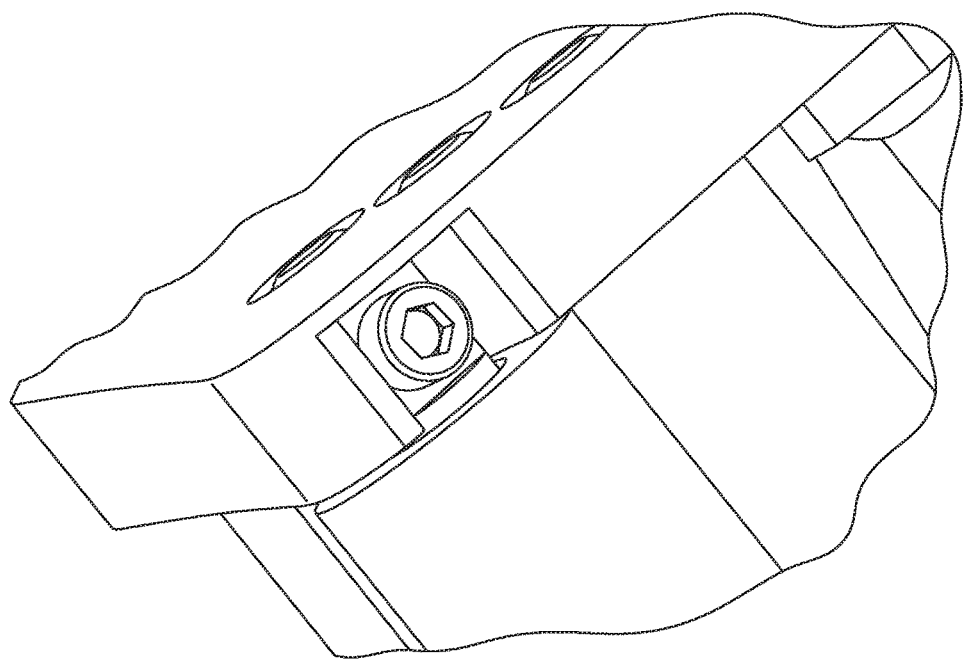
FIG. 4A is an enlarged perspective view showing an alternative mount for the skid bar shown in FIG. 4.

Cross bar 90 is easy to replace if damaged, due to attachment points that can be accessed externally. The two ends of the cross bar are removably mounted, e.g., with bolts 91 extending through end mounts 94. In some implementations, the ends of the cross bar 90 can be mounted in slots in end mounts 94, as shown in FIG. 4A, further simplifying removal and replacement. When these slots are provided, the cross bar ends have flats which create an interference fit with the opposing vertical walls of the slots. The cross bar ends drop into the slots and the bar is then secured to each end mount 94 with a fastening screw running through each end of the bar and threading into the bottom surface of the slot.

In preferred embodiments the golf board includes cross bars on both the front and rear wheel assemblies.

In some implementations the gearbox 22, the housing of which is formed of aluminum and thus subject to damage, is also wrapped in impact-resistant plastic, e.g., with a UHEMW wrap. The wrap generally is sufficiently thick to provide the desired degree of protection, e.g., from about 5 to 10 mm.

Suspension System Features

Like prior golf boards, the golf board 10 includes a suspension system. The uneven and variable terrain found on golf courses require a comfortable and durable suspension system for the board, to allow the rider to experience a smooth ride across the varying terrain. The suspension system of the golf board 10 includes spring ends and rubber bump stops, discussed in detail below, that cooperate to provide enhanced safety, durability, and user comfort.

A pair of spring ends 104 and 108 are mounted, one on each end of the board, providing a resilient connection between the frame assembly 14, which houses the electronics tray and battery and supports the deck, and the wheel assemblies. The spring ends enhance user comfort and protect components in the electronics tray from excessive jarring. Spring ends 104 and 108, shown in detail in FIG. 7, each include a mounting portion 120 that wraps around and is attached to the end of the frame assembly 14, and a spring portion 122 that extends outwardly from the mounting portion at an angle and that is integral with the mounting portion. The spring portion includes a plurality of attachment holes 124, which allow the spring portion to be bolted to the wheel assembly.

Figure 7:
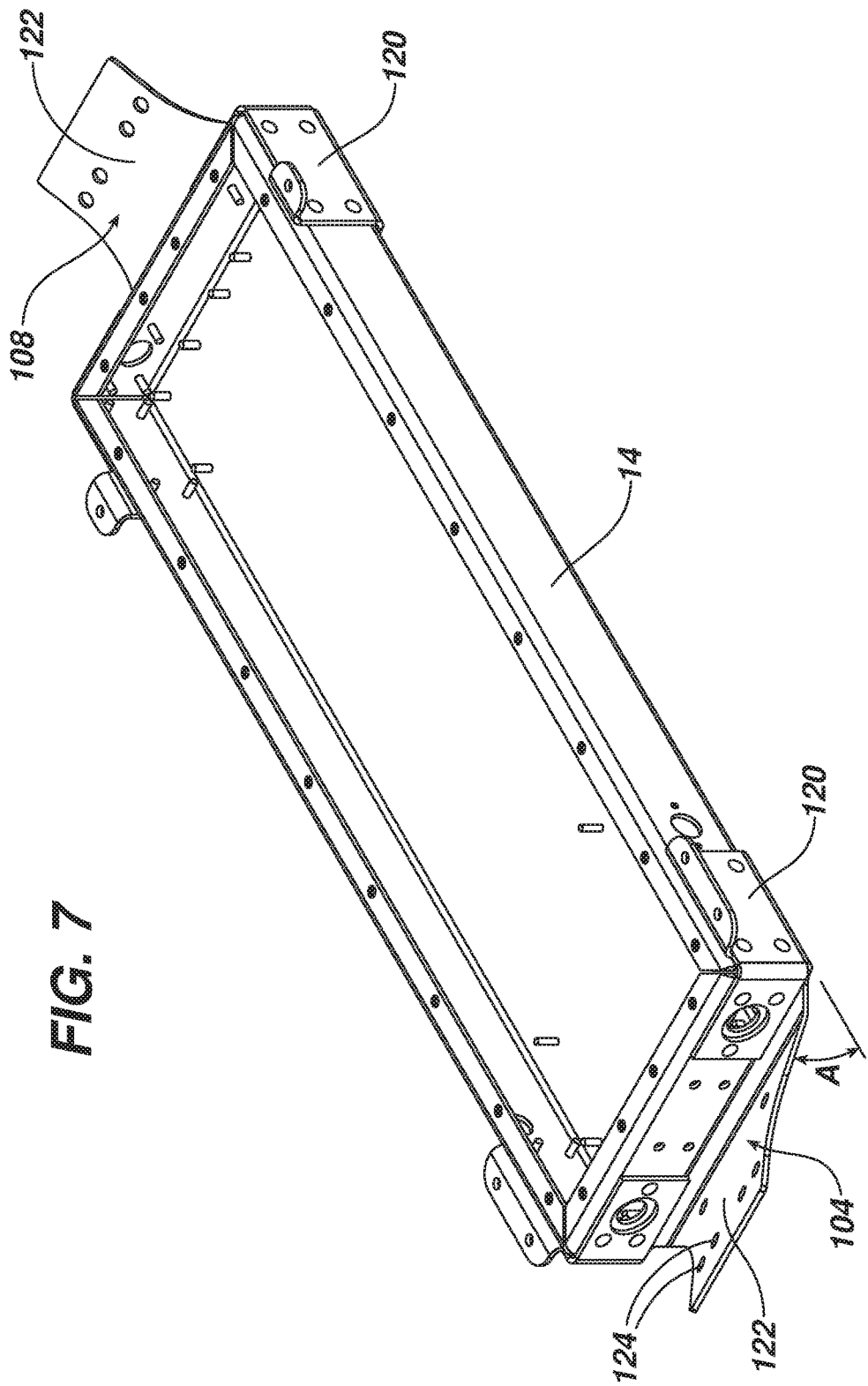
FIG. 7 is a perspective view of the frame of the golf board, showing the spring ends used to mount the deck of the golf board to the wheel assemblies at each end.

The spring ends are disposed at a spring angle relative to the plane of the lower surface of the deck (angle A, FIG. 7). In some implementations, the spring angle is from about 25 to 45 degrees, e.g., from about 25 to 35 degrees and in some cases from about 28 to 32 degrees.

In some implementations, the spring ends are made from heat-treated stainless steel, which flexes when force is applied but returns to its original position when the force is released. In some cases, the spring ends are formed of 410 Stainless Steel that has been heat treated to spring temper the steel to a Rockwell Hardness of C 41-45. Other suitable materials include, for example, 302, 410, and 17-p steels, carbon fiber, and mild steel The material may have a passivated finish to prevent corrosion. The thickness of the spring ends is selected to provide the desired flexural properties and durability. In some implementations the steel may have a thickness of from about 2 to 6 mm, e.g., from about 3 to 5 mm.

A pair of front and rear rubber bump stops 100, 106, cooperate with the spring ends to limit suspension travel by limiting flexing of the spring ends, thereby dampening the suspension feel during use and enhancing safety and ride comfort. The bump stops also tend to prevent damage to the spring ends that can occur due to the metal being stressed/fatigued by excessive spring travel.

Figure 5:
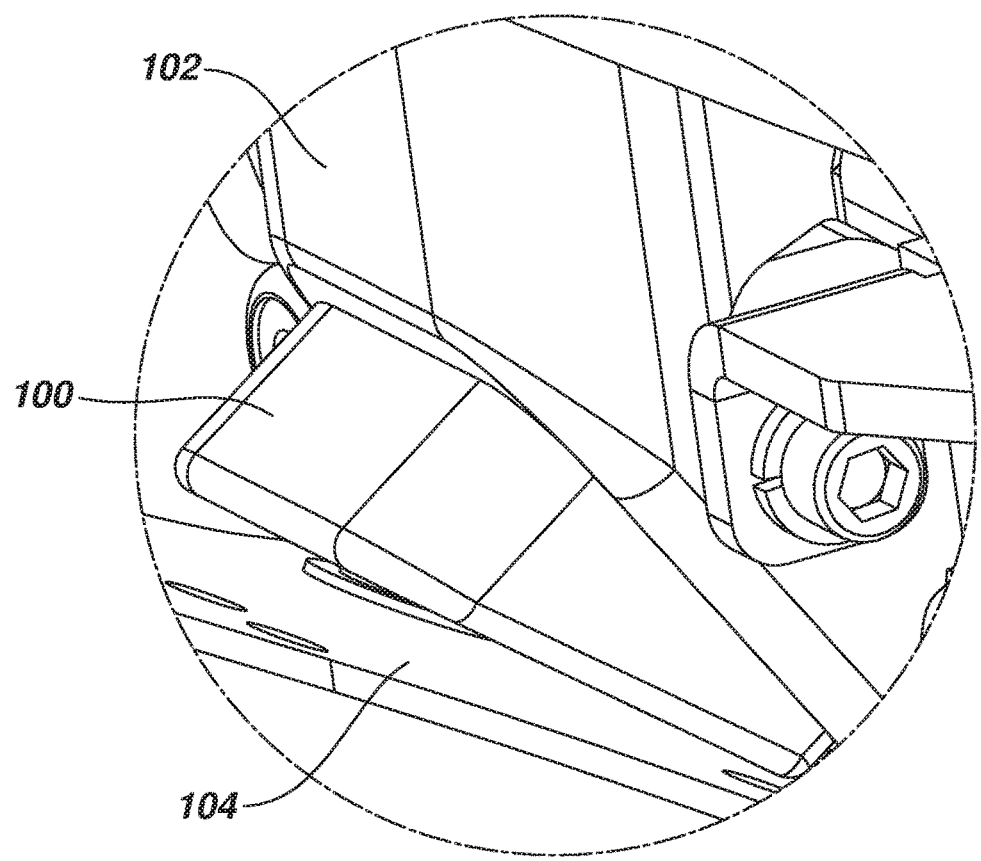
FIG. 5 is an enlarged perspective view of a front portion of the golf board shown in FIG. 1A, showing a front bump stop.

Front bump stop 100, shown in FIG. 5, is a wedge shaped elastomeric member that is mounted between the front spring end 104 and an angled surface of a base 102 in which the stability bar is mounted. A gap is provided between the spring end 104 and the opposing surface of the front bump stop, so that the front bump stop does not contact the spring end 104 (and thereby reduce the spring rate of the spring end) until some flexing of the spring end 104 has occurred. The width of the gap may be from about 1 to 20 mm, e.g., about 5 to 15 mm, measured at the approximate midpoint of the opposing surfaces of the bump stop and spring end. In some cases, the gap may be omitted, for example if the golf board is intended for use on relatively smooth terrain. However, without the gap the suspension may tend to feel bouncy, like a trampoline. The rubber bump stop provides damping which reduces the trampoline effect and helps regulate the spring rate in a way that provides an overall more stable riding feel, so that the user does not feel like he or she is being bounced off the board over tough terrain.

In some implementations, the rubber bump stop is formed of a thermoplastic elastomer having a durometer of from about 60 to 80 Shore A, e.g., about 65 to 75 Shore A. The bump stop 100 may be secured in any desired manner, e.g., with pressure sensitive double sided tape.

Figure 6:
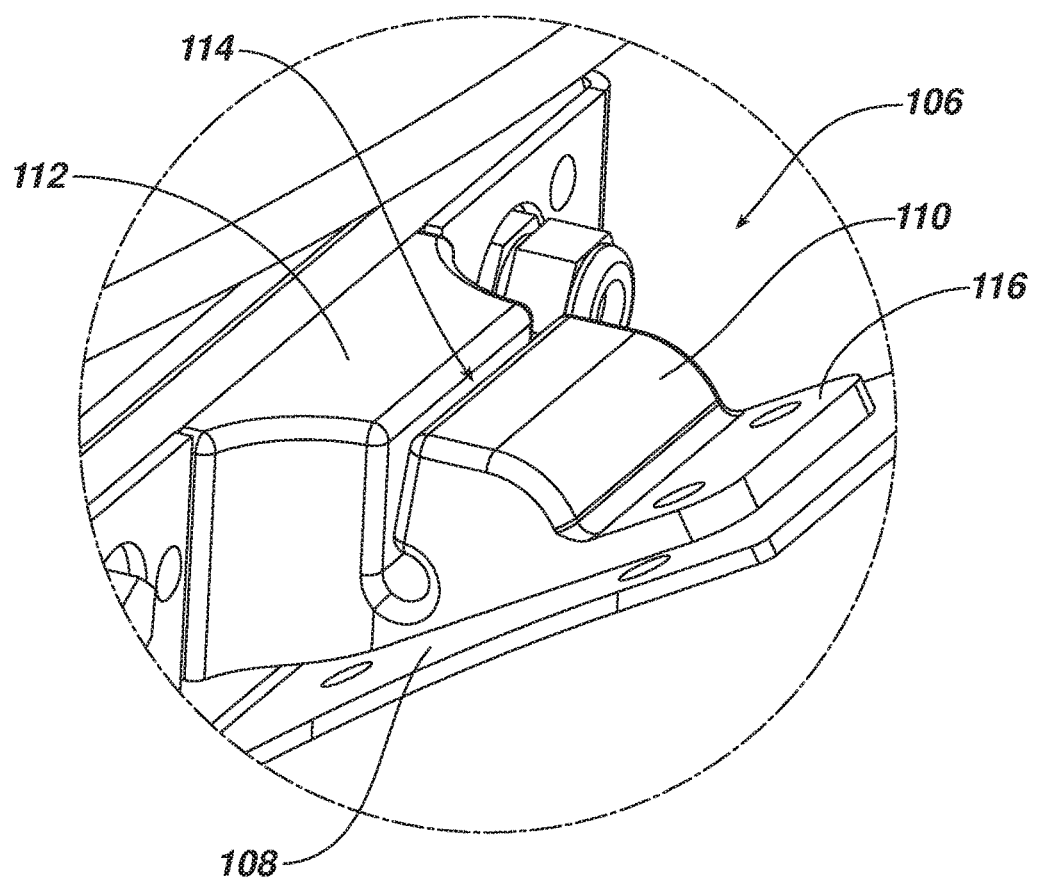
FIG. 6 is an enlarged perspective view of a rear portion of the golf board, shown in FIG. 1B, showing a rear bump stop.

Rear bump stop 106, shown in FIG. 6, is mounted between a vertical surface of the frame assembly 14 and an angled surface of the rear spring end 108. The rear bump stop has a front portion 110 and a rear portion 112, separated by a generally U-shaped channel 114. The front and rear portions 110, 112, come together when spring end 108 flexes. The channel 114 provides a relief so that the bump stop does not reduce spring rate until the front and rear portions make contact, i.e., when reduced spring rate is needed, deeper in the spring stroke of the suspension. The width of the channel (distance between the opposing surfaces of portions 110 and 112) may be from about 1 to 20 mm, e.g., about 5 to 15 mm, measured at the approximate midpoint of the opposing surfaces of the front and rear portions. Again, the channel can be omitted in some cases, but this may lead to a bouncy feeling ride.

The rear bump stop may be formed of a thermoplastic elastomer that is slightly softer than that used for the front bump stop. For example, the rear bump stop elastomer may have a durometer of from about 50 to 70 Shore A, e.g., about 55 to 65 Shore A.

The rear bump stop may be secured in any desired manner, for example with pressure sensitive adhesive with screws or other mechanical fasteners securing an attachment portion 116 of the bump stop to the spring end.

Cooler and Accessory Mounting System

In some implementations, the golf board includes a mounting system that allows various accessories to be rapidly attached to and removed from the board for rider convenience.

Figure 8:
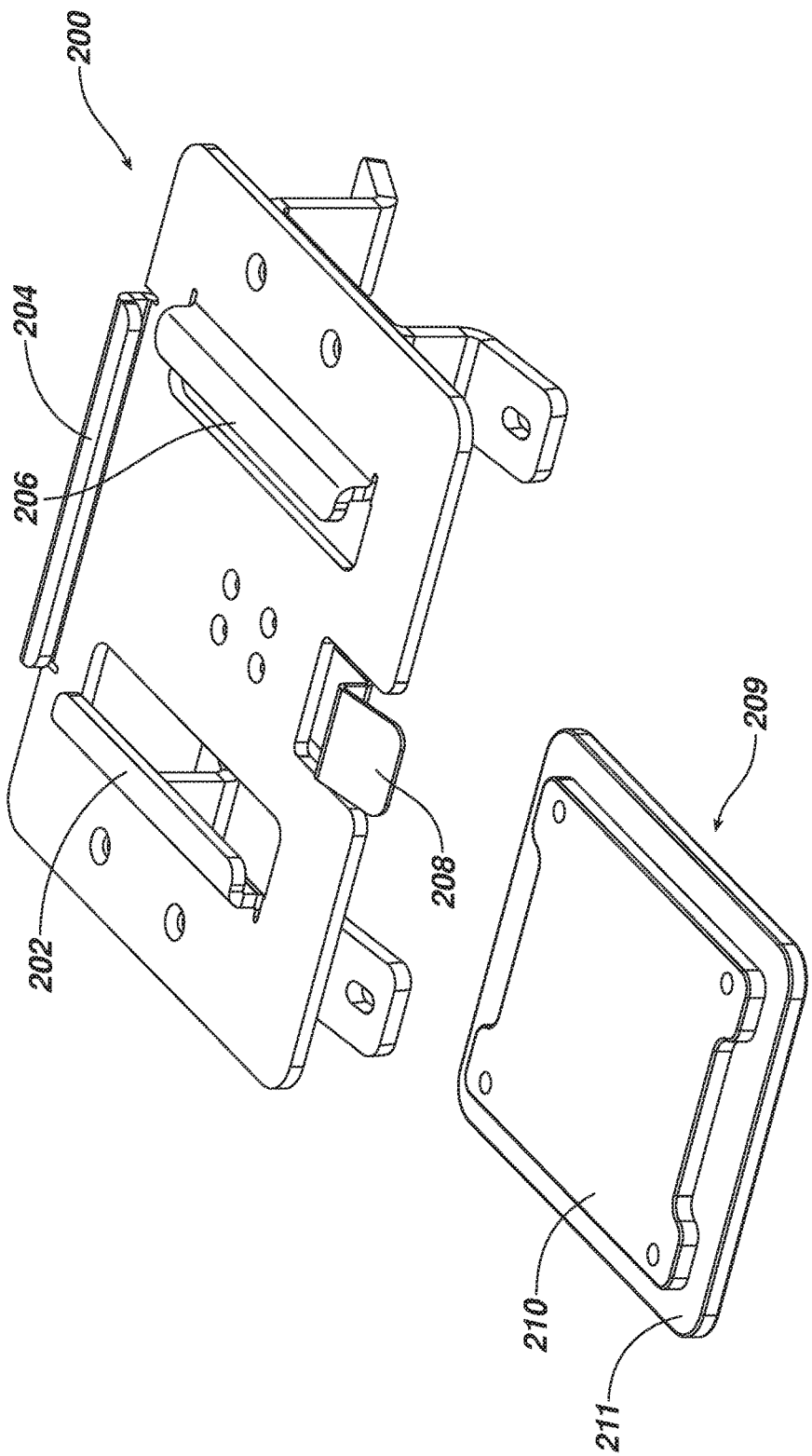
FIG. 8 is an enlarged perspective view of the rear rack shown in FIG. 1 and a corresponding accessory plate that engages the rear rack.

An accessory item such as a cooler (FIG. 1A) can be mounted on a rear rack of the golf board using the slide-in mounting plate 200 shown in FIG. 1 and in detail in FIG. 8.

Other accessory items can be mounted interchangeably on mounting plate 200, for example a basket, cooler, seat, or other storage device or accessory. This provides operational benefits for personal owners and fleet operators. For example, using the mounting system a cooler can be removed quickly and easily for cleaning or adding ice during fleet operation at a golfing facility. As another example, a personal user can mount a cooler during hot weather, and a basket when the user would rather carry other items such as clothing layers.

Referring to FIG. 8, the slide-in mounting plate 200 receives a corresponding accessory plate 209. Mounting plate 200 includes three generally L-shaped retaining elements 202, 204 and 206 that receive the accessory plate 209 in sliding engagement. A locking tongue member 208 flexes downwardly to allow the accessory plate 209 to slide under the retaining elements, and then springs back to its raised position to lock the accessory plate in place.

The accessory plate 209 includes a spacer plate 210 and an attachment plate 211. Spacer plate 210 is mounted on the lower surface of the accessory. Spacer plate 210 is smaller than attachment plate 211, such that a rim of the attachment plate extends around the perimeter of the spacer plate. Spacer plate 210 has a thickness such that the exposed rim of the attachment plate 211 is spaced a sufficient distance from the lower surface of the accessory to allow the L-shaped retaining elements to slide between the rim of the attachment plate and the lower surface of the accessory.

Other Embodiments

A number of embodiments have been described. Nevertheless, it will be understood that various modifications may be made without departing from the spirit and scope of the disclosure.

Figure 9:
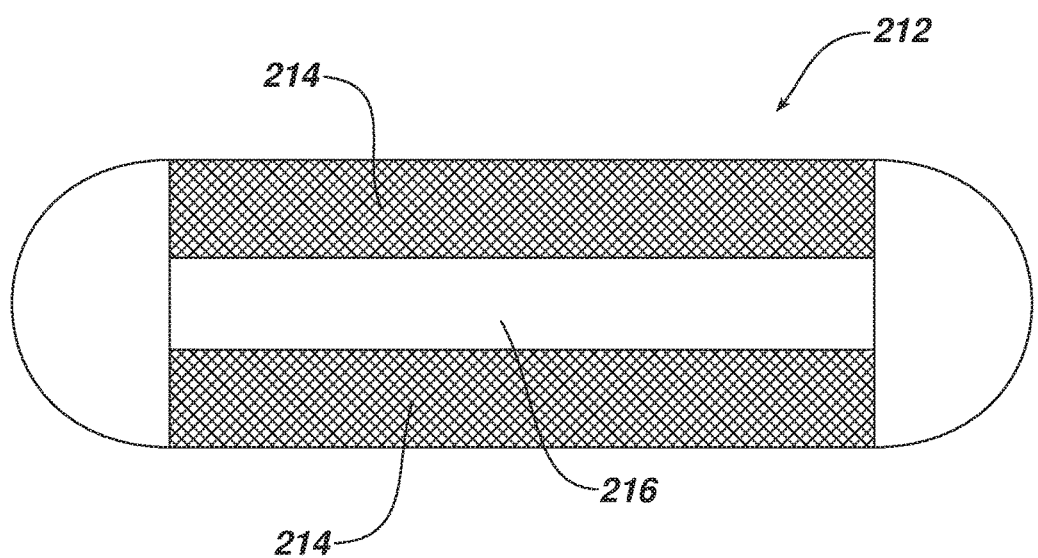
FIG. 9 is a top plan view showing an alternative deck surface.

For example, while in some implementations the deck of the golf board may be smooth, the deck may be covered partially or entirely with a non-slip tread surface. Referring to FIG. 9, in some cases it may be desirable to have the sides of the deck 212 covered with a tread surface 214 and leave a central strip 216 of the deck free of the tread surface, to provide an area that will not collect mud and/or other debris. Other arrangements may also be used, for example an elongated central area, e.g., area 218 in FIG. 1, may be left free of tread.

As another example, while spring-type power-off electromagnetic brakes are discussed above, other types of power-off electromagnetic brakes may be used, e.g., permanent magnet-type electromagnetic brakes. In such brakes, instead of squeezing a friction disk, via springs, permanent magnets are used to attract a single face armature. When the brake is engaged, the permanent magnets create magnetic lines of flux, which attract the armature to the brake housing. To disengage the brake, power is applied to the coil, setting up an alternate magnetic field that cancels out the magnetic flux of the permanent magnets.

Accordingly, other embodiments are within the scope of the following claims.

What is claimed is:

1. A device comprising:
    a frame assembly,
    a battery pack mounted to the underside of the frame assembly,
    a deck affixed to said frame assembly and configured to support a user in a standing position,
    a stability bar extending vertically from said deck,
    a set of handlebars extending from said stability bar, a front wheel assembly mounted on a front portions of the frame assembly, a rear wheel assembly mounted on a rear portion of the frame assembly, each wheel assembly having a drive axle, at least one motor and a gearbox operatively connected to at least one of the wheel assemblies, said motor operative connected to said battery pack, and at least one cross bar, extending generally parallel to the drive axle, removeably mounted to a set of end mounts affixed to said frame assembly so as to reside lower than a lowest point of the power train.

2. A device comprising:

a frame assembly, a battery pack mounted to the underside of the frame assembly, a deck affixed to said frame assembly and configured to support a user in a standing position, a stability bar extending vertically from said deck, a set of handlebars extending from said stability bar, a front wheel assembly mounted on a front portions of the frame assembly, a rear wheel assembly mounted on a rear portion of the frame assembly, each wheel assembly having a drive axle, at least one motor and a gearbox operatively connected to at least one of the wheel assemblies, said motor operative connected to said battery pack, and a first crossbar mounted in front of the front wheel assembly and a second crossbar mounted behind the rear wheel assembly, said second cross bar extending generally parallel to the drive axle, removeably mounted to a set of end mounts affixed to said frame assembly so as to reside lower than a lowest point of the power train;

wherein the first cross bar and second cross bar each have an outer plastic surface having a dynamic coefficient of friction of 0.25 or less.

3. A device comprising:

a deck configured to support a user in a standing position, wheel assemblies mounted on front and rear portions of the deck, a power train, operatively associated with at least one of the wheel assemblies, said power train comprising a drive motor and a gear box;

a pair of elastomeric bump stops, and a suspension system configured to resiliently join the wheel assemblies to the deck, the suspension system comprising a pair of spring ends positioned at opposite ends of the deck, the spring ends being configured to flex during use of the device, said bump stops limiting said flex, therein decreasing a spring rate of the suspension system, and wherein said bump stops include a relief feature configured to allow a degree of flexing to occur before said bump stop decreases said spring rate.

4. The device of claim 3 wherein the spring ends are disposed at a spring angle relative to the plane of the lower surface of the deck of from about 25 to 45 degrees.

5. The device of claim 3 wherein the spring ends are formed of 410 Stainless Steel that has been heat treated to spring temper the steel to a Rockwell Hardness of C 41-45.

* * * * *